United States Patent
Park et al.

(10) Patent No.: US 8,709,525 B2
(45) Date of Patent: Apr. 29, 2014

(54) PROCESS FOR PREPARING SOYBEAN CURD USING MICRONIZED SOLUTION OF SOYBEAN CURD

(75) Inventors: Jin Sang Park, Chungcheongbuk-do (KR); Jong Hyun Ryoo, Incheon (KR); Soon Hee Kwon, Gyeonggi-do (KR); Hong Wook Park, Seoul (KR); Min Choul Shin, Gyeonggi-do (KR)

(73) Assignee: CJ Cheiljedang Corporation, Seoul (KR)

( * ) Notice: Subject to any disclaimer, the term of this patent is extended or adjusted under 35 U.S.C. 154(b) by 232 days.

(21) Appl. No.: 13/275,440

(22) Filed: Oct. 18, 2011

(65) Prior Publication Data
US 2012/0107483 A1     May 3, 2012

(30) Foreign Application Priority Data
Oct. 27, 2010 (KR) .................. 10-2010-0105126

(51) Int. Cl.
*A23L 1/211* (2006.01)
(52) U.S. Cl.
USPC .......................................... 426/634; 426/598
(58) Field of Classification Search
USPC .................................. 426/634, 598
See application file for complete search history.

(56) References Cited

U.S. PATENT DOCUMENTS

2008/0268098 A1 * 10/2008 Cho et al. .................. 426/46

FOREIGN PATENT DOCUMENTS

| JP | 11-155512 | | 6/1999 |
|---|---|---|---|
| JP | 2004-065218 | | 3/2004 |
| JP | 2004-222618 | | 8/2004 |
| KR | 2005034176 | * | 4/2005 |
| KR | 1020090082007 A | | 7/2009 |

OTHER PUBLICATIONS

English Tranlsation for KR 2005034176 published Apr. 2005.*

* cited by examiner

*Primary Examiner* — Anthony Weier
(74) *Attorney, Agent, or Firm* — Swanson & Bratschun, L.L.C.

(57) ABSTRACT

Present invention relates to a process for preparing soybean curd, including removing moisture of non-standardized soybean curd; mixing the non-standardized soybean curd of which moisture was removed with soybean milk; obtaining micronized solution of soybean curd by grinding and filtering a mixture thereof; and mixing the micronized solution of soybean curd with a coagulant and soybean milk so as to coagulate it.

9 Claims, 2 Drawing Sheets

PROCESS FOR PREPARING SOYBEAN CURD USING MICRONIZED SOLUTION OF SOYBEAN CURD

CROSS-REFERENCE(S) TO RELATED APPLICATIONS

The present invention claims priority of Korean Patent Application No. 10-2010-0105126, filed on Oct. 27, 2010, which is incorporated herein by reference.

BACKGROUND OF THE INVENTION

1. Field of the Invention

The present invention relates to a process for preparing soybean curd using micronized solution of soybean curd, which can prepare the soybean curd reusing non-standardized soybean curd products and bean-curd residue.

2. Description of Related Art

Generally, soybean curd is manufactured by grinding and heating beans soaked in water, removing bean-curd residue and then adding a coagulant.

Residues separated through the grinding, heating and filtering in a general method of preparing soybean curd is called Biji, bean-curd residue which are rich in soybean components such as protein and fiber. The bean-curd residue in preparing the soybean curd are generated in large quantities as a by-product and typically used as feedstuff. Recently, there has been proposed various methods of reducing generation of bean-curd residue and also using the bean-curd residue in various field, but they are not yet achieved properly.

Further, a large amount of non-standardized soybean curd products are generated in the coagulating process and the equipment operating process of the soybean curd preparing method. The non-standardized soybean curd products may be mixed with vegetables and the like, packaged, sterilized and then used as soybean curd processed foods, or reused as secondary raw materials. But most of them are discarded as industrial wastes.

SUMMARY OF THE INVENTION

An embodiment of the present invention is directed to providing a process for preparing soybean curd, in which micronized solution of soybean curd is formed by grinding and filtering non-standardized soybean curd products together with soybean milk, and then coagulated together with soybean milk, thereby providing high quality soybean curd.

Another embodiment of the present invention is directed to providing a process for preparing soybean curd, in which micronized solution of soybean curd is formed using non-standardized soybean curd products to be discarded, and then coagulated together with soybean milk.

Another embodiment of the present invention is directed to providing a process for preparing soybean curd using micronized solution of soybean curd, in which solution of bean-curd residue is selectively added to the micronized solution of soybean curd, and then the mixture is coagulated together with soybean milk.

To achieve the object of the present invention, the present invention provides a process for preparing soybean curd, including removing moisture of non-standardized soybean curd; mixing the non-standardized soybean curd of which moisture was removed together with soybean milk; obtaining micronized solution of soybean curd by grinding and filtering a mixture thereof; and mixing the micronized solution of soybean curd with a coagulant and soybean milk so as to coagulate it.

Preferably, in the process, solution of bean-curd residue is selectively added to the micronized solution of soybean curd.

DESCRIPTION OF SPECIFIC EMBODIMENTS

Figure 1:
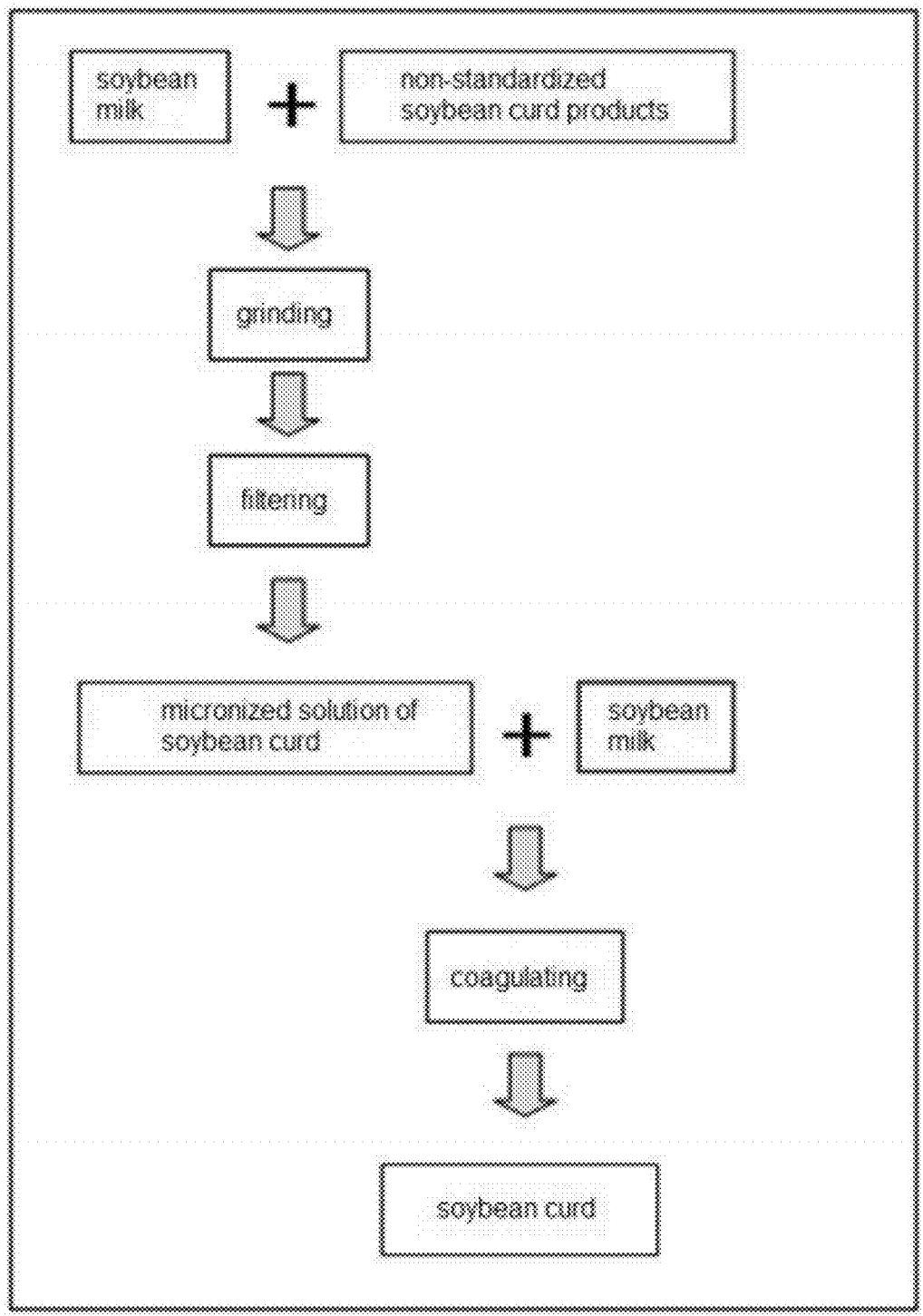
FIG. 1 is a schematic view showing a method of preparing soybean curd, in which micronized solution of soybean curd is mixed with soybean milk and then coagulated.
Figure 2:
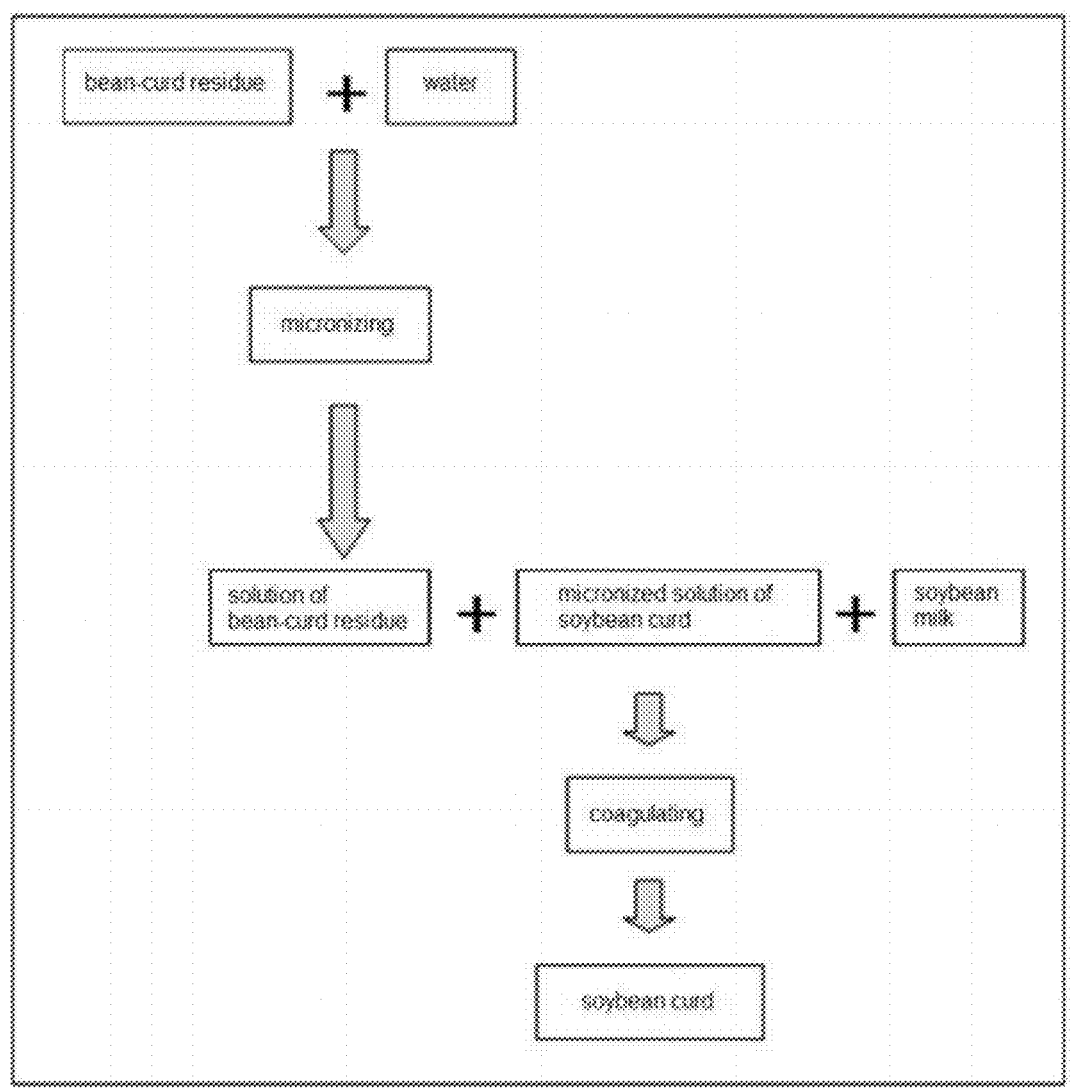
FIG. 2 is a schematic view showing a method of preparing soybean curd, in which micronized solution of soybean curd is mixed with solution of bean-curd residue and soybean milk and then coagulated.

The present invention provides a process for preparing soybean curd, including: (a) removing moisture of non-standardized soybean curd; (b) mixing the non-standardized soybean curd of which moisture was removed, together with soybean milk; (c) obtaining micronized solution of soybean curd by grinding and filtering a mixture thereof; and (d) mixing the micronized solution of soybean curd with a coagulant and soybean milk so as to coagulate it.

The present invention is to prepare the soybean curd using non-standardized soybean curd products which molding by the coagulation is already finished but to be discarded in the selective process. Therefore, the quality of micronized solution of soybean curd is very important.

In case that the micronized solution of soybean curd has rough particles, binding capacity of the soybean curd may be lowered when the micronized solution of soybean curd is coagulated together with the soybean milk, and texture thereof is also deteriorated. Therefore, it is preferable that the non-standardized soybean curd products are processed into micronized particles.

Hereinafter, the embodiments of the present invention will be described in detail with reference to accompanying drawings.

In the present invention, the non-standardized soybean curd products include any every kind of soybean curd which molding is finished by coagulation, such as cotton-cloth-filtered soybean curd and packed soybean curd.

In the step (a), the non-standardized soybean curd products are put on a filter net so as to remove the moisture contained therein.

Preferably, the filter net has a hole size of about 5 mm and a time period for removing the moisture is 10~30 minutes. If the moisture is excessively removed, an amount of soybean milk to be used in the grinding is increased, and if the moisture is insufficiently removed, the quality of the micronized solution of soybean curd is deteriorated.

In the step (b), it is preferable that a mixing ratio of the non-standardized soybean curd products of which moisture was removed and the soybean milk is 1:1~1:3. If an amount of soybean milk is excessive, an amount of soybean curd used is reduced, and if the amount thereof is too small, it is difficult to perform the grinding.

Preferably, a concentration of soybean milk is 5~15 brix. If the concentration thereof is too high, it is difficult to perform the grinding due to a high viscosity, and if the concentration thereof is too low, it is difficult to form the soybean curd in the coagulating due to the low concentration of the soybean milk.

In the step (c), the mixture of the non-standardized soybean curd products of which moisture was removed and the soybean milk is finely ground with micronized-grinding method, for example, a colloid mill and thus formed into the micronized particles. After the grounding, the mixture is filtered by using a filter so as to provide uniform particle size distribution.

Every kind of filter can be used as the above-mentioned filter.

Herein, it is preferable that the filter net has a hole size of 50~300 μm, most preferably 50~25 μm. If the size of the filter net is too small, the filter net may be clogged and thus the filtering efficiency may be reduced, and if the size is too large, the particle size becomes rough and thus the binding capacity of the soybean curd is lowered.

The particle size in the micronized solution of soybean curd is preferably 50~300 μm, most preferably 50~250 μm. If the particle size is more than 300 μm, the binding capacity and texture are deteriorated and thus poor results are caused in the sensual aspect, and if the particle size is less than 5 μm, the binding capacity is also deteriorated.

After the grinding, if the particles are not micronized properly, it should be noted that filtering loss may be occurred.

In the step (d), the micronized solution of soybean curd obtained in the step (c) is injected into the soybean milk and then mixed with a coagulant, thereby coagulating the mixture thereof. Preferably, an injected amount of the micronized solution of soybean curd is 1.5~15% of a whole amount of the soybean milk.

Preferably, a main component of the coagulant is $MgCl_2.6H_2O$, and added amount of the coagulant is 0.2~0.35% of an amount of the soybean milk. If the coagulant is excessively added, the quality of soybean curd is deteriorated, and if the coagulant is insufficiently added, the quality of soybean curd is also deteriorated due to poor coagulation.

It seems that forming of network is promoted while the particles of the micronized solution of soybean curd are coagulated due to the coagulant, and thus a binding capacity of the soybean curd is enhanced.

Therefore, if an injection ratio of the micronized solution of soybean curd is too high, an amount of micronized solution of soybean curd, which is not coagulated with the coagulant, is increased, and thus formation of network is lowered, the binding capacity of the soybean curd is deteriorated and the sensual preference such as texture is also reduced. Also, if the injection ratio is too low, the effect of promoting the forming of network in the micronized solution of soybean curd is lowered.

The present invention also provides a process for preparing soybean curd, in which solution of bean-curd residue is selectively added to the micronized solution of soybean curd and the mixture is coagulated together with soybean milk.

The bean-curd residue are generated in filtering of a soybean milk preparing process.

The bean-curd residue are micronized together with water so as to form the solution of bean-curd residue.

Herein, a mixing ratio of the bean-curd residue and water is preferably 1:3~10 weight ratio. If an amount of water is too small, it is difficult to micronize the bean-curd residue, and if the amount of water is too large, a concentration of the bean-curd residue solution is lowered, and thus the quality of soybean curd is deteriorated.

Every kind of micronizing device which can micronize the bean-curd residue can be used in the present invention.

A particle size of the micronized solution of bean-curd residue is preferably 10~25 μm, and most preferably 10~200 μm. If the particle size is more than 25 μm, the binding capacity of the soybean curd is deteriorated.

The prepared solution of bean-curd residue and the micronized solution of soybean curd are mixed with soybean milk and then coagulated with the coagulant, thereby preparing the soybean curd.

Preferably, an injection amount of the solution of bean-curd residue is the same as that of the micronized solution of soybean curd, and is also 1.5~5% of a whole amount of soybean milk. If the amount of the solution of bean-curd residue is too large or too small, the quality of soybean curd is deteriorated.

Hereinafter, the preferred embodiments of the present invention will be described.

EXAMPLE 1

Preparation of Micronized Solution of Soybean Curd 100 kg of soybean curd (non-standardized soybean curd) which was separated after preparing cotton-cloth-filtered bean curd was put on a filter net having a hole size of 5 mm for 20 minutes in order to remove moisture. Then, the non-standardized soybean curd of which moisture was removed was mixed with 100 L of soybean milk (Brix 10.5%) and then ground using a colloid mill manufactured by Masuko company.

The ground solution was filtered by a screw filter having a filter net of 100 μm manufactured by Mase company, thereby obtaining micronized solution of soybean curd. The micronized solution of soybean curd has an average particle size of 80 μm.

EXAMPLE 2

Preparation of Solution of Bean-Curd Residue

After 100 kg of bean-curd residue obtained in the process of preparing the cotton-cloth-filtered bean curd was mixed with 400 L of water, the mixture was micronized by using a Comitrol food processor manufactured by Urschel company, thereby obtaining solution of bean-curd residue. The solution of bean-curd residue has an average particle size of 90 μm.

EXAMPLE 3

Preparation of Soybean Curd A

2 L of the micronized solution of soybean curd formed in the example 1 was mixed with 40 L of soybean milk (having a concentration of 11 Brix), and a small amount of water in which 120 g of a coagulant (magnesium chloride hexahydrate) was dissolved was injected therein so as to coagulate the mixture. And the coagulated mixture was put into a molding box and then pressured for 20 minutes, thereby preparing the cotton-cloth-filtered bean curd.

EXAMPLE 4

Preparation of Soybean Curd B

2 L of the micronized solution of soybean curd formed in the example 1 was mixed with 2 L of the solution of bean-curd residue formed in the example 2 and 40 L of soybean milk (having a concentration of 11 Brix), and a small amount of water in which 125 g of a coagulant (magnesium chloride hexahydrate) was dissolved was injected therein so as to coagulate the mixture. And the coagulated mixture was put into a molding box and then pressured for 20 minutes, thereby preparing the cotton-cloth-filtered bean curd.

EXAMPLE 5

Preparation of Soybean Curd C

General cotton-cloth-filtered bean curd was prepared without the micronized solution of soybean curd and solution of bean-curd residue.

EXAMPLE 6

Sensual Test of Prepared Soybean Curd

Five well-trained assessors performed sensory evaluation for the soybean curds prepared in the example 3 to example 5 based on a 5-point scaling method.

TABLE 1

|  | Preference | Taste | Texture | Smell |
|---|---|---|---|---|
| Soybean curd A (using micronized solution of soybean curd) | 4.4 | 4.6 | 4.7 | 4.3 |
| Soybean curd B (using micronized solution of soybean curd and solution of bean-curd residue) | 4.3 | 4.6 | 4.5 | 4.4 |
| Soybean curd C (typical cotton-cloth-filtered soybean curd) | 4.5 | 4.8 | 4.6 | 4.5 |

According to results of sensory evaluation of the soybean curds including the micronized solution of soybean curd, or the micronized solution of soybean curd and solution of bean-curd residue, as shown in table 1, Preference thereof was almost the same as the cotton-cloth-filtered bean curd. Therefore, it could be understood that the quality thereof was good.

EXAMPLE 7

Texture Evaluation of Prepared Soybean Curd

TPA (Texture Profile Analysis) was performed by using a TA-XT express texture analyzer (Stable Micro Systems) so as to evaluate hardness, elasticity and chewiness thereof.

Herein, a cylinder probe having a diameter of 20 mm was used. The soybean curds A, B and C were measured three times, respectively and average values thereof were described in table 2.

TABLE 2

|  | Hardness (g) | Elasticity (J) | Chewiness (g) |
|---|---|---|---|
| Soybean curd A (using micronized solution of soybean curd) | 324.8 | 316.1 | 286.5 |

TABLE 2-continued

|  | Hardness (g) | Elasticity (J) | Chewiness (g) |
|---|---|---|---|
| Soybean curd B (using micronized solution of soybean curd and solution of bean-curd residue) | 343.9 | 301.6 | 304.6 |
| Soybean curd C (typical cotton-cloth-filtered soybean curd) | 293.6 | 291.9 | 268.3 |

As shown in table 2, the soybean curds A and B had higher values in the hardness, elasticity and chewiness than the typical cotton-cloth-filtered bean curd. Therefore, it could be understood that the texture of them was the same as or higher than that of the typical cotton-cloth-filtered bean curd.

According to the present invention, since the soybean curd is prepared by using the non-standardized soybean curd products and bean-curd residue to be discarded, it is possible to prevent a waste of resources and also to create a new market.

While the present invention has been described with respect to the specific embodiments, it will be apparent to those skilled in the art that various changes and modifications may be made without departing from the spirit and scope of the invention as defined in the following claims.

What is claimed is:

1. A process for preparing soybean curd, comprising:
   (a) removing moisture of non-standardized soybean curd;
   (b) mixing the non-standardized soybean curd of which moisture was removed with soybean milk;
   (c) micronizing a mixture obtained from step (b) by grinding and filtering a mixture thereof; and
   (d) mixing the micronized solution of obtained from step (c) with a coagulant and soybean milk so as to coagulate it.

2. The process of claim 1, wherein a mixing ratio of the non-standardized soybean curd of which moisture was removed with the soybean milk in the step (b) is 1:1~1:3.

3. The process of claim 2, wherein a concentration of the soybean milk is 5~15 Brix.

4. The process of claim 1, wherein, in the filtering of the mixture, a filter net has a hole size of 50-300 μm and a particle size of the micronized solution of soybean curd is 50-300 μm.

5. The process of claim 1, wherein, in the step (d), an injected amount of the micronized solution of soybean curd is 1.5~15% of a whole amount of the soybean milk.

6. The process of claim 1, wherein, in the step (d), solution of bean-curd residue is selectively added.

7. The process of claim 6, wherein a mixing ratio of the bean-curd residue and water is preferably 1:3~10 weight ratio.

8. The process of claim 6, wherein an injection amount of the solution of bean-curd residue is 1.5~5% of a whole amount of the soybean milk.

9. The process of claim 6, wherein a particle size of the solution of bean-curd residue is 10-250 μm.

* * * * *